United States Patent
Jarrossay et al.

(10) Patent No.: US 11,480,064 B2
(45) Date of Patent: Oct. 25, 2022

(54) DISTRIBUTOR MADE OF CMC, WITH STRESS RELIEF PROVIDED BY A SEALED CLAMP

(71) Applicant: SAFRAN AIRCRAFT ENGINES, Paris (FR)

(72) Inventors: Clément Jarrossay, Moissy-Cramayel (FR); Sébastien Serge Francis Congratel, Moissy-Cramayel (FR); Antoine Claude Michel Etienne Danis, Moissy-Cramayel (FR); Clément Jean Pierre Duffau, Moissy-Cramayel (FR); Lucien Henri Jacques Quennehen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/047,989

(22) PCT Filed: Apr. 15, 2019

(86) PCT No.: PCT/FR2019/050880
§ 371 (c)(1),
(2) Date: Oct. 15, 2020

(87) PCT Pub. No.: WO2019/202249
PCT Pub. Date: Oct. 24, 2019

(65) Prior Publication Data
US 2021/0108525 A1 Apr. 15, 2021

(30) Foreign Application Priority Data
Apr. 17, 2018 (FR) ...................................... 1853352

(51) Int. Cl.
*F01D 9/04* (2006.01)
*F01D 5/18* (2006.01)
*F01D 5/28* (2006.01)

(52) U.S. Cl.
CPC .............. *F01D 9/042* (2013.01); *F01D 5/18* (2013.01); *F01D 5/282* (2013.01); *F01D 9/041* (2013.01);
(Continued)

(58) Field of Classification Search
CPC ..... F01D 9/00; F01D 9/02; F01D 9/04; F01D 9/041; F01D 9/042; F01D 5/18;
(Continued)

(56) References Cited

U.S. PATENT DOCUMENTS

| 2006/0032237 A1* | 2/2006 | Aumont | F23R 3/007 60/796 |
| 2007/0154307 A1* | 7/2007 | Cairo | F01D 9/042 415/209.3 |

(Continued)

FOREIGN PATENT DOCUMENTS

| EP | 2 443 318 A1 | 4/2012 |
| FR | 2 979 662 A1 | 3/2013 |

(Continued)

OTHER PUBLICATIONS

International Search Report as issued in International Patent Application No. PCT/FR2019/050880, dated Oct. 28, 2019.

*Primary Examiner* — Eldon T Brockman
*Assistant Examiner* — Elton K Wong
(74) *Attorney, Agent, or Firm* — Pillsbury Winthrop Shaw Pittman LLP (57) ABSTRACT

A turbine of a turbo engine includes a casing and a nozzle stage including an outer metal shroud secured to the casing, an inner metal shroud, and a plurality of ring sectors made of ceramic-matrix composite material each having an internal platform, an external platform and at least one blade extending between the external platform and the internal platform and secured thereto. The internal platform of each sector includes a first and a second tab protruding radially inwardly from respectively an upstream end and a downstream end of the internal platform, and the inner shroud includes a shoulder protruding radially outwardly and being in abutment upstream against the first tab, and a clamp downstream of the shoulder including two jaws extending radially outwardly and held under stress towards each other against the second tab.

12 Claims, 5 Drawing Sheets

(52) U.S. Cl.
CPC .... *F05D 2240/128* (2013.01); *F05D 2260/31* (2013.01); *F05D 2300/6033* (2013.01)

(58) Field of Classification Search
CPC ........ F01D 5/282; F01D 5/284; F01D 25/246; F05D 2240/128; F05D 2260/31; F05D 2300/6033
See application file for complete search history.

(56) References Cited

U.S. PATENT DOCUMENTS

| | | | |
|---|---|---|---|
| 2012/0251309 A1* | 10/2012 | Beaujard | F01D 9/065 |
| | | | 415/200 |
| 2014/0234118 A1* | 8/2014 | Beaujard | F01D 5/3092 |
| | | | 416/241 R |
| 2014/0356151 A1* | 12/2014 | Fremont | F01D 9/041 |
| | | | 415/200 |
| 2015/0089957 A1* | 4/2015 | Schwartz | F01D 25/243 |
| | | | 60/796 |
| 2016/0090851 A1* | 3/2016 | Carr | F01D 9/042 |
| | | | 415/208.1 |

FOREIGN PATENT DOCUMENTS

| | | |
|---|---|---|
| FR | 3 011 271 A1 | 4/2015 |
| WO | WO 2010/061140 A1 | 6/2010 |
| WO | WO 2010/116066 A1 | 10/2010 |
| WO | WO 2010/146288 A1 | 12/2010 |
| WO | WO 2011/080443 A1 | 7/2011 |
| WO | WO 2013/079859 A1 | 6/2013 |

* cited by examiner

DISTRIBUTOR MADE OF CMC, WITH STRESS RELIEF PROVIDED BY A SEALED CLAMP

CROSS-REFERENCE TO RELATED APPLICATIONS

This application is the U.S. National Stage of PCT/FR2019/050880, filed Apr. 15, 2019, which in turn claims priority to French patent application number 1853352 filed Apr. 17, 2018. The content of these applications are incorporated herein by reference in their entireties.

BACKGROUND OF THE INVENTION

The invention relates to turbo engines, in particular aeronautical turbine engines or industrial turbines, and more particularly a turbine nozzle stage made of ceramic-matrix or at least partially ceramic-matrix composite material, hereinafter referred to as CMC material.

The field of application of the invention is in particular that of aeronautical gas turbine engines. The invention is however applicable to other turbo engines, for example industrial turbines.

The improvement of the performances of turbo engines and the reduction of their pollutant emissions leads to consider increasingly higher operating temperatures.

For elements of hot portions of turbo engines, it has therefore been proposed to use ceramic-matrix composite materials noted CMC thereafter.

The CMC materials are typically formed from a fibrous reinforcement made of refractory fibers, such as carbon or ceramic fibers, densified by a ceramic or at least partially ceramic matrix.

These materials have remarkable thermo-structural properties, that is to say mechanical properties which make them capable of constituting structural elements and the ability to maintain these properties at high temperatures. In addition, CMC materials have a density much lower than that of the metal materials traditionally used for elements of hot portions of turbo engines.

Thus, the documents WO 2010/061140, WO 2010/116066 and WO 2011/080443 describe the production of vanes of movable wheels of turbo engines made of CMC with integrated platform and heel. The use of CMC materials for turbine nozzles has also been proposed, in particular in documents WO 2010/146288, FR 2 979 662 and EP 2 443 318.

A traditional metal turbine nozzle stage has a crown shape made up of several assembled sectors, each sector comprising an internal platform, an external platform and a plurality of blades extending between the internal and external platforms and secured thereto. The juxtaposed internal platforms form an internal shroud and the juxtaposed external platforms form an external shroud. The internal and external shrouds delimit the gas flowpath in the nozzle stage.

Introducing a nozzle stage, for example a high-pressure nozzle stage, made of CMC allows increasing the maximum tolerated temperature compared to a metal nozzle stage, and thus decreasing the amount of cooling air used. This allows thus enhancing the performances of the turbo engine.

However, the CMC, by its properties very different from metal, is more sensitive to some mechanical stresses. Indeed, the CMC has greater rigidity and lower expansion. It behaves better in compression, but its admissible tensile stresses are lower than those of metal.

In addition, the integration of a CMC part into a metallic environment is difficult because of the differential thermal expansions between CMC and metal. This is all the more difficult in a turbo engine, and more particularly in a high-pressure portion of the turbo engine, because the environment is very hot, which accentuates the differences in the coefficients of thermal expansion between the materials, the aerodynamic forces undergone by a high-pressure nozzle stage being also very high in this turbine area.

CMC nozzle stages are known, such as for example a turbine nozzle stage including an outer support shroud secured to a casing, an inner support shroud, and a plurality of CMC ring sectors forming a crown extending between the outer support shroud and the inner support shroud. Each ring sector is bearing on the inner and outer support shrouds and includes an internal platform, an external platform, and at least one blade extending between the external platform and the internal platform and secured thereto.

However, there is a need to improve the known solutions regarding the deterministic securing of the CMC ring sector with the inner shroud, in particular in terms of at least axial holding of the ring sector and in terms of take-up of the aerodynamic forces.

In addition, a significant pressure differential is exerted on the casing under the nozzle stage in the radial direction. This casing is used to create a sealing between the rotor and the stator. This pressure variation is a source of a force which, if it were exerted on the CMC, would be too high given the admissible agents of the materials.

There is also known a nozzle stage as described above and further including a reinforcing mast extending radially inside the vanes between the two platforms.

However, such a solution takes up both, via the mast, the forces relating to the pressure differential under the nozzle stage and the aerodynamic forces on the CMC crown.

It is also known from document FR 3 011 271 a device for connecting a fixed turbo engine portion with a nozzle root of a turbine of this turbo engine. This device comprises an annular body and two upstream and downstream annular flanges secured to the body and adapted to pinch the root of the nozzle. At least one of the two annular flanges is interrupted by forming an expansion or retraction slot under the effect of a difference in inner temperatures of the device.

The device forms a clamp-fixing system to mechanically link the inter-turbine casing to the first nozzle stage of the low-pressure turbine. The system described comprises a shroud, the body, connecting the two clamps together. This flexible part allows compensating for the axial movement of the nozzle relative to the casing, the axial movement being largely caused by the force of the flowpath gases.

However, such a system does not allow compensating for the relative movements between the parts of the nozzle, and in particular an expansion variation between two tangentially adjacent and not axially adjacent parts, the expansion variation being due to the presence of CMC material at the expansion coefficient lower than that of the metal.

There is therefore a need to improve the deterministic holding of the CMC nozzle of this solution.

OBJECT AND SUMMARY OF THE INVENTION

The invention aims at overcoming the drawbacks mentioned above and at overcoming the difficulties mentioned above by proposing a turbine of a turbo engine comprising a turbine nozzle stage at least partly made of CMC whose mounting is simplified and adapted to hold its ring sectors in a deterministic manner while allowing the sectors to be deformed independently of the metal parts at the interface, and guaranteeing a satisfactory sealing between the cavity under the nozzle, that is to say the radially inner cavity relative to the nozzle, and the downstream cavity, that is to say the cavity located axially downstream of the nozzle relative to the direction of the air stream.

An object of the invention proposes a turbine of a turbo engine comprising a casing and a turbine nozzle stage, the turbine nozzle stage including an outer support shroud made of metal and secured to the casing, an inner support shroud made of metal, and a plurality of ring sectors made of ceramic-matrix composite material forming a crown and extending between the outer support shroud and the inner support shroud and having an internal shroud and an external shroud forming therebetween a fluid flowpath, the crown defining an axial direction and a radial direction. Each ring sector has an internal platform forming a portion of the internal shroud, an external platform forming a portion of the external shroud, and at least one blade extending between the external platform and the internal platform, said at least one blade being secured to the internal external platforms. The external platform of each sector comprises a first portion equipped with an inner face forming the outer surface of the fluid flowpath, and a second portion radially distant and external to the first portion, the second portion of the external platform being fixed to the outer support shroud.

According to a general characteristic of the invention, the internal platform of each sector comprises a first tab and a second tab extending along the radial direction protruding inwardly from respectively an upstream axial end and a downstream axial end of the internal platform, and the inner support shroud comprises a shoulder protruding in the radial direction outwardly and being positioned upstream and in abutment in the axial direction against said first tab, and a clamp axially downstream of the shoulder and including two jaws extending in the radial direction outwardly and held under stress towards each other against the second tab of the internal platform.

The fixing of the CMC sector to the outer support shroud made of metal allows taking up the forces of gases exerted on the blade and the platforms.

The nozzle stage thus allows maintaining good strength of each CMC sector by the metal parts in hot mode, and this despite the variations in expansion of the materials while guaranteeing a good sealing between the cavity under the nozzle and the downstream cavity using in particular an annular part in one piece. The nozzle is held on the radially inner side thanks to a clamp formed by the jaws on the downstream side.

The holding of the internal platform of the sectors between the shoulder and the clamp formed by the jaws of the inner shroud allows applying a pre-stress on the CMC sector in cold mode, which allows maintaining the clamping in hot mode, despite the presence of a differential expansion between the CMC of the sector and the metal of the other elements.

The turbine, which thus comprises a radial fixing of each CMC sector to an outer metal support shroud as well as an axial holding to an element of the support structure comprising the outer shroud and the inner shroud, thus allows having a deterministic holding of the nozzle on the casing, which allows better controlling the positioning and the displacements, and therefore, the clearances, which are crucial for the performances of the engine.

In a first aspect of the turbine, the jaws of the inner support shroud can be held together by means of a screw passing through the two jaws and cooperating with a nut.

In a second aspect of the turbine, the inner support shroud further comprises first sheet ring sections and second sheet ring sections inserted between the two jaws, each second tab of the internal platform being comprised along the axial direction between a first and a second sheet ring sections.

The first and second sheet ring sections form two sheet crowns disposed on either side of the second tab of the internal platform of the ring sectors which makes it possible to guarantee a good sealing while maintaining a certain flexibility thanks to the intersection slots, and thus avoid subjecting each CMC sector to stresses that are too high in cold mode.

In a third aspect of the turbine, the first sheet ring sections preferably form a first sheet crown having first spaces extending radially between said first sheet ring sections, and the second sheet ring sections form a second sheet crown having second spaces extending radially between said second sheet ring sections, the first spaces and the second spaces being offset along the axial direction.

The interleaving of the first sheet sections and of the second sheet sections thus allows guaranteeing the sealing at the level of the jaws that hold the nozzle.

In a fourth aspect of the turbine, a first jaw of the two jaws is secured to the shoulder of the inner support shroud via a central portion, and a second jaw of the two jaws comprises a crown equipped with radial slots extending over at least a portion of the radial length of the crown.

The radial slots in the crown of the second jaw allow increasing the flexibility of the second jaw. By aligning these radial slots with the interstices separating two CMC sectors, the second jaw has increased flexibility for each CMC sector.

The second jaw can be totally sectored so as to even more release the stresses.

In a fifth aspect of the turbine, the radial slots of the second jaw are offset along the axial direction relative to the second spaces and/or to the first spaces so as to improve the sealing of the nozzle stage.

In a sixth aspect of the turbine, each radial slot can separate two ring sections from the nozzle stage.

In a seventh aspect of the turbine, said at least one blade of each CMC sector has a hollow profile defining an inner housing extending between the internal platform and the external platform, the internal and external platforms of each sector each have an orifice communicating with said inner housing of said at least one blade, and each sector of the nozzle stage comprises at least one mast passing through said orifices of the platforms and the inner housing of said at least one blade, said mast being fixed to said casing and in connection with said ring sector and said inner support shroud, the connection being able to be direct or indirect.

As mentioned above, an additional difficulty is generated by the pressure differential between the upstream and the downstream of the internal platform of the nozzle stage and the casing attached thereto. This casing is used to create a sealing between the rotor and the stator. The pressure difference can reach a value between 2 to 50 bars. This creates a significant force which is a source of significant stresses, in particular in the gripping area, by generating a moment via the lever arm which is the blade. This pressure variation is a source of a force which, if it was exerted on the CMC, would be too high taking into account the admissible agents of the material.

The mast allows providing a means for fixing a sector of a CMC nozzle stage from above, that is to say to the casing, while minimizing the bending moment, insofar as the bending length is reduced by about half due to the mast passing through the annular sector, the force being already greatly reduced due to the fact that the nozzle stage according to the invention does not take up the force linked to the difference in pressure on the inner shroud.

Each sector of the nozzle stage is thus maintained in a deterministic manner, that is to say so as to prevent the sector from vibrating and controlling its position, and this while allowing the sector to be deformed under the effects of temperature and pressure, inter alia independently of the metal parts at the interface.

The turbine according to the invention thus allows having a nozzle stage taking up the pressure differential forces in the flowpath on the blade not by the CMC elements, but by the metal mast which benefits from a better admissible agent than the CMC elements.

In an eighth aspect of the turbine, the mast may comprise at least one protruding portion extending in a plane transversal to the radial direction along which the mast extends and in connection with the blade to hold the blade in position.

The sleeve defines a ball joint making it possible to minimize the force due to the aerodynamic moment without modifying the integration of the sector in the turbine. Indeed, the ball joint thus formed inside the blade lets the blade free to move about the axis defined by the mast.

In a ninth aspect of the turbine, the internal platform of each sector may further comprise a second radial tab protruding in the radial direction inwardly from a downstream end of the internal platform, the internal platform being fixed to the inner support shroud by pinching of the first and second radial tabs of the internal platform in the axial direction between said shoulder of the inner support shroud and a clamp including two jaws extending in the radial direction outwardly and held under stress towards each other against the second radial tab of the internal platform.

Alternatively, the inner support shroud may comprise a perforated crown including orifices for receiving one end of the mast, and a retaining ring on which the crown is mounted.

In a tenth aspect of the turbine, the mast may be hollow and comprise perforations over its entire height to deliver a cooling air stream, the air stream being conveyed inside the mast from the casing.

The mast can be made of metal material so as to offer good mechanical strength, the mast taking up all the aerodynamic forces to transfer them to the casing.

The mast can be made of any other material.

Each sector can comprise a plurality of blades at least one of them comprises a mast.

In an eleventh aspect of the turbine, the second portion of the external platform, the blade and the first tab of the internal platform are formed in a single weaving part of ceramic-matrix composite material, which allows strengthening the structure of the ring sector.

The turbine may further comprise at least one reinforcement disposed in the radial direction between the first portion and the second portion of the external platform, said at least one reinforcement comprising a first wall bearing against a radially outer face of the first portion and a second bearing wall against a radially inner face of the second portion, at least one reinforcement being fixed to the outer support shroud with the second portion of the external platform.

The region extending radially between the first portion and the second portion is the most mechanically loaded, the lever arm of the pressure forces being maximum therein.

The reinforcement forms a thickening of the platform in this region which allows stiffening it and lowering the stresses exerted therein.

The second portion of the external platform can be fixed to the outer support shroud using at least one assembly comprising a screw and a nut, the screw passing through the external platform of the sector and the outer support shroud.

The second portion of the external platform of each sector can comprise at least one rotational abutment element and the outer support shroud can comprise at least one complementary rotational abutment element configured to cooperate with a rotational abutment element of the external platform.

The rotational abutment thus makes it easier to position and assemble the nozzle stage and to take up the moment around the radial axis.

The rotational abutment can be formed by an orifice in the second portion of the external platform of each sector and, for each external platform orifice, a centering lug radially protruding inwardly from the outer metal shroud, the centering lugs being configured to each cooperate with an external platform orifice to maintain the sector in position in an axial direction and a circumferential direction of the nozzle stage.

Alternatively, the rotational abutment may be formed by a notch provided in the second portion of the external platform of each ring sector and an abutment protruding radially inwardly from the outer metal shroud and configured for cooperate with one of said notches.

The first portion of the external platform may comprise a portion protruding outwardly in the radial direction from an upstream end of the external platform.

Said radial portion thus allows improving the sealing of the fluid flowpath.

The object of the invention is also a turbo engine comprising at least one turbine of a turbo engine as defined above.

Another object of the invention is also an aircraft comprising at least one turbo engine as defined above.

BRIEF DESCRIPTION OF THE DRAWINGS

The invention will be better understood upon reading the following, as indication but without limitation, with reference to the appended drawings wherein.

DETAILED DESCRIPTION OF EMBODIMENTS

Figure 1:
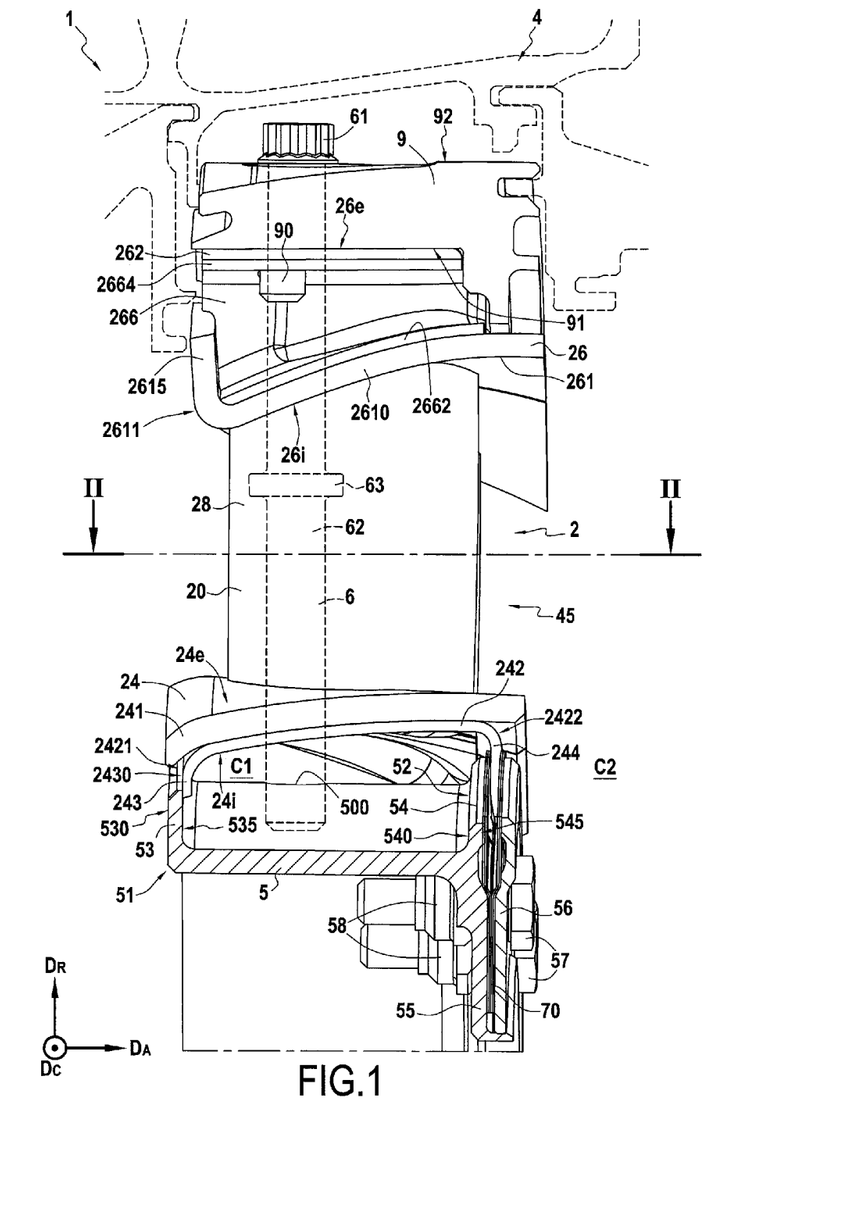
FIG. 1 is a schematic view of a ring sector of a nozzle stage in a plane defined by the radial direction and the axial direction of the ring according to a first embodiment of the invention.

FIG. 1 illustrates a schematic view of a ring sector of a nozzle stage in a plane defined by the radial direction and the axial direction of the nozzle stage according to a first embodiment of the invention.

Figure 2:
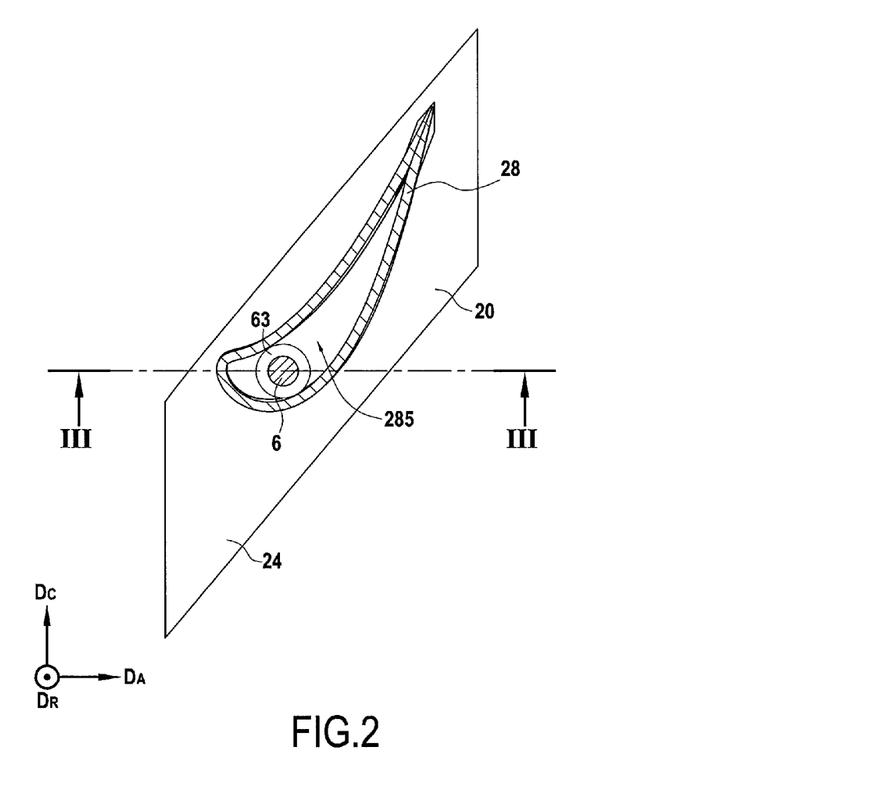
FIG. 2 shows a sectional view of the ring sector of FIG. 1 in a plane defined by the axial direction and the circumferential direction of the nozzle stage.
Figure 3:
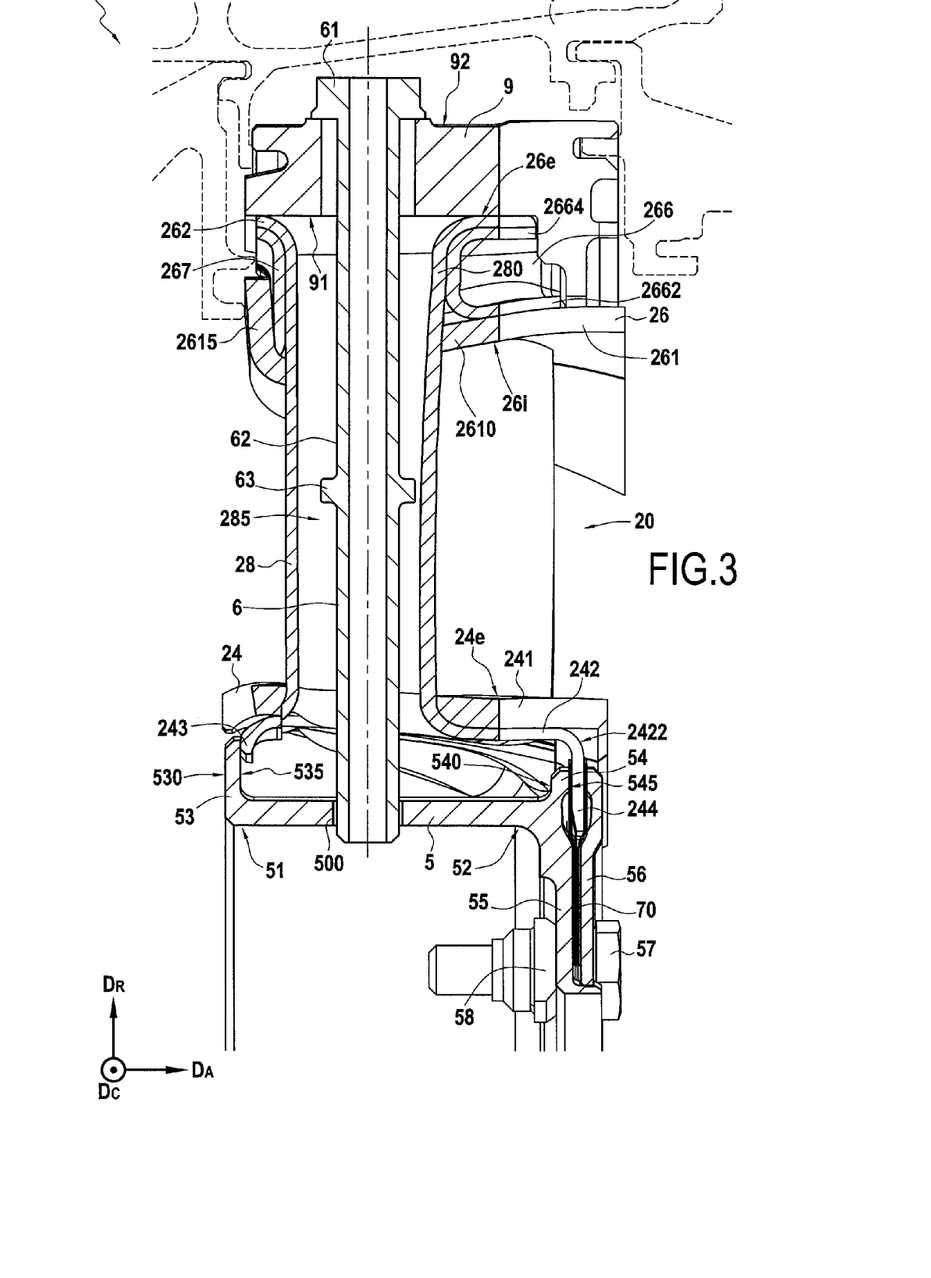
FIG. 3 shows a schematic sectional view of the ring sector of FIG. 1 in a plane defined by the radial direction and the axial direction.
Figure 4:
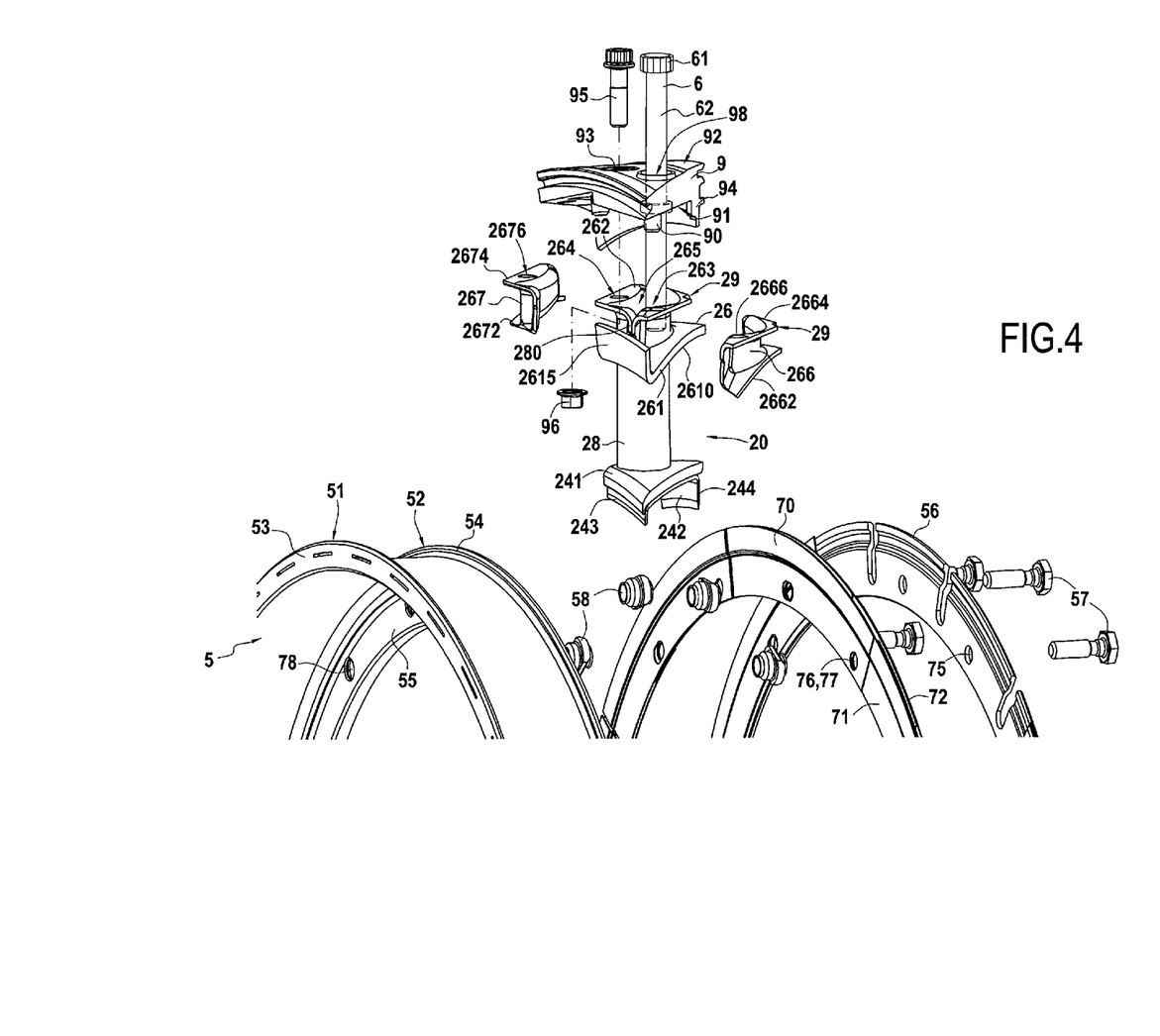
FIG. 4 is an exploded schematic view of the ring sector of FIG. 1.
Figure 5:
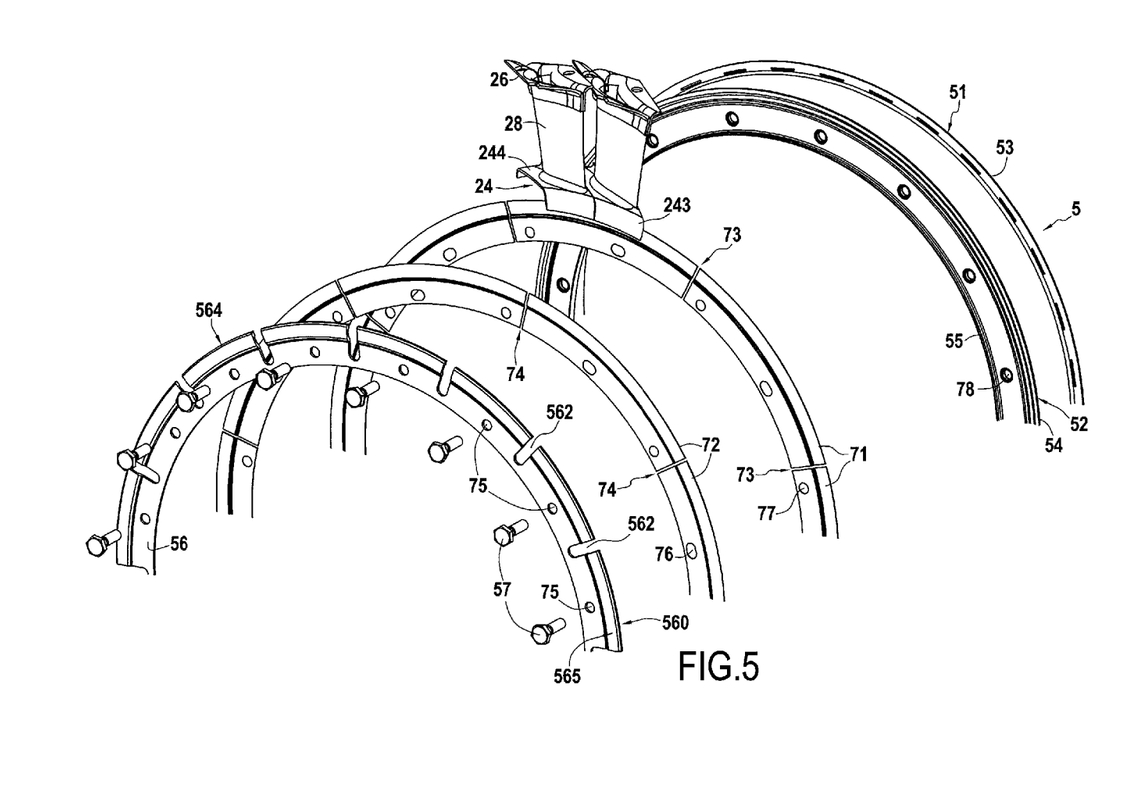
FIG. 5 show a view according to a second embodiment of the invention.

FIGS. 2 to 4 show respectively a sectional view in a plane defined by the axial direction and the circumferential direction, a schematic sectional view in a plane defined by the radial direction and the axial direction and an exploded schematic view of the ring sector of FIG. 1.

A high-pressure turbine 1 of a turbo engine, for example an aeronautical turbine engine, as shown partially in FIG. 1, comprises a plurality of fixed nozzle stages 2 which alternate with movable wheels in the flow direction, indicated by an arrow in FIG. 1, of the gas stream F in the turbine 1 and which are mounted in a turbine casing 4.

Each movable wheel comprises a plurality of vanes having an internal shroud, and at least one blade extending from the internal shroud and linked thereto. On the internal side of the internal shroud, the vane is extended by a root engaged in a housing of a disc. On the external side, the tips of the vanes is facing an abradable material carried by a ring to ensure the sealing of the tips of the vanes.

Throughout the present text, the terms "internal" or "inner" and "external" or "outer" are used with reference to the position or the orientation with respect to the axis of rotation of the turbine 1 which defines the axial direction $D_A$ of the turbine 1.

The vanes of the movable wheel can be traditional metal vanes or vanes made of CMC material obtained for example as described in documents WO 2010/061140, WO 2010/116066, WO 2011/080443.

At least one of the nozzle stages 2 of the turbine 1 is formed by joining together several ring sectors 20 made of CMC material to form a complete ring. The arrow $D_A$ indicates the axial direction of the nozzle stage 2 while the arrow $D_R$ indicates the radial direction of the nozzle stage 2.

Each ring sector 20 of the nozzle stage 2 comprises an internal platform 24, an external platform 26 and a blade 28 extending between the internal and external platforms 24 and 26 and secured thereto. Alternatively, several blades could extend between the internal and external platforms of the same nozzle sector. Once assembled with the casing 4 of the turbine 1, the sectors 20 form a single nozzle crown 2 having an internal shroud formed by the juxtaposition of the internal platforms 24 of the sectors 20 and an external shroud formed by the juxtaposition of the external platforms 26 of the sectors 20.

The internal shroud and the external shroud form therebetween a fluid flowpath 45 inside which the gas stream F flows during operation of the turbine 1.

Throughout the text, the terms "upstream" and "downstream" are used with reference to the flow direction of gas stream F in the flowpath 45 indicated by an arrow.

The internal platforms 24 forming the internal shroud of the nozzle stage 2 each comprise a first portion 241 and a second portion 242 in contact with each other and secured to the ring sector 20. The first and second portions 241 and 242 can be molded together or woven together or secured together differently during the consolidation through gaseous process or during the infiltration operation called "Melt Infiltration" of the ring sector and corresponding to a rise of silicon through liquid process thanks to the capillarity within the textile.

The internal platforms 24 each have an external surface 24e intended to be in contact with the gas stream F and formed by the surface of the first portion 241 of the internal platforms 24 oriented radially outwardly, and therefore disposed radially facing the external platforms 26 forming the external shroud. The internal platforms 24 further have an internal surface 24i disposed facing the axis of rotation of the turbine 1, and formed by the surface of the second portion 242 of the internal platforms 24 oriented radially inwardly.

The external platforms 26 each comprise a first portion 261 and a second portion 262 secured to the ring sector 20. The first and second portions 261 and 262 of the external platforms 26 can be molded or woven or secured to the ring sector 20 during its design. The external platforms 26 each have an external surface 26e disposed facing the casing 4 and formed by the surface of the second portion 262 of the external platforms 26 oriented radially outwardly. The external platforms 26 further have an internal surface 26i intended to be in contact with the gas stream F and formed by the surface of the first portion 261 of the external platforms 26 oriented radially inwardly, and therefore disposed radially facing the internal platforms 24 forming the internal shroud and facing the axis of rotation of the turbine 1.

As the sectors 20 form the nozzle stage 2, the internal platform 24 of each sector 20 therefore has a portion of the external surface and a portion of the internal surface of the external shroud, and the external platform 26 of each sector 20 also has a portion of the external surface and a portion of the internal surface of the internal shroud. The blade 28 of each sector 20 extends between the external surface 24e of the internal platform 24 of the ring sector 20 and the internal surface 26i of the external platform 26 of the ring sector 20, and an extension 280 of the blade 28 also extends between the first portion 261 and the second portion 262 of the external platform 26.

The rectifier stage 2 further comprises an inner metal shroud 5 and an outer metal shroud 9 between which extends the crown formed by the assembly of the ring sectors 20 of the nozzle stage 2. The inner metal shroud 5 is secured to the casing 4.

The inner metal shroud 5 has an annular portion extending in the axial direction $D_A$ and in the circumferential direction $D_C$ and comprising at each end 51 and 52 along the axial direction $D_A$, that is to say at an upstream end 51 and a downstream end 52, an upstream attachment tab 53 and a downstream attachment tab 54 extending in the radial direction $D_R$ outwardly, that is to say towards the internal platform 24, and more particularly its internal surface 24i, of the ring sector crown 20, and towards the outer metal shroud 9.

The second portion 242 of the internal platform 24 of the ring sector 20 has, in the axial direction $D_A$, an upstream end 2421 and a downstream end 2422 each having a tab 243 and 244 protruding in the radial direction $D_R$ inwardly.

The upstream attachment tab 53 has an upstream surface 530 and a downstream surface 535, the downstream surface 535 bears against the upstream end 2421 of the second portion 242 of the internal platform 24 of the ring sector 20, and more particularly against an upstream surface 2430 of the upstream tab 243 protruding from the upstream end 241 of the internal platform 24.

The inner metal shroud 5 further comprises a portion 55 protruding in the radial direction $D_R$ inwardly in the extension of the downstream attachment tab 54. The protruding portion 55 and the downstream attachment tab 54 are in the same radial plane defined by the radial direction $D_R$ and the circumferential direction $D_C$.

The downstream attachment tab 54 has an upstream surface 540 and a downstream surface 545. The downstream surface 545 is bearing against the downstream tab 244 via a first sheet ring section 71, the downstream tab 244 being formed at the downstream end 242 of the internal platform 24 of the ring sector 20. The first sheet ring section 71 is thus interposed between the downstream tab 244 and the downstream surface 545 of the downstream attachment tab 54 of the inner metal shroud 5.

The rectifier stage 2 comprises a plurality of first sheet ring sections 71 forming together a first sheet crown, two first sheet ring sections 71 of the first sheet crown being separated by a first inter-sector space 73.

To hold the internal platform 24 in position, the inner metal shroud 5 further comprises a locking ring 56 which can be made in one piece or be circumferentially sectored. The locking ring 56 comprises a planar upstream surface 560 extending in the radial direction $D_R$ disposed facing the downstream surface 545 of the attachment tab 54 and a downstream surface 565 opposite the upstream surface 560. The upstream surface 560 is bearing against the downstream tab 244 via a second sheet ring section 72. The second sheet ring section 72 is thus interposed between the downstream tab 244 and the upstream surface 560 of the locking ring 56 of the inner metal shroud 5.

Due to the relatively high temperatures, the locking ring 56 is made of a nickel or cobalt based material. The material of the locking ring 56 preferably has a Young's modulus which allows having a good compromise between flexibility and stiffness, so as not to stress the CMC too much and not to allow too much movement.

The rectifier stage 2 comprises a plurality of second sheet ring sections 72 forming together a second sheet crown, two second sheet ring sections 72 of the second sheet crown being separated by a second inter-sector space 74.

The locking ring 56 is fixed using screws 57 and nuts 58, the screws 55 each passing successively through the locking ring 56, a second sheet ring section 72, a first sheet ring section 71 and the protruding portion 55 radially inwardly of the inner metal shroud 5 via four coaxial holes 75 to 78 made respectively in the locking ring 56, a second sheet ring section 72, a first sheet ring section 71 and in the protruding portion 55 radially inwardly of the inner metal shroud 5. The holes 75 to 78 can be circular or oblong.

The inner metal shroud 5 is configured so that the clamping of the locking ring 56 against the protruding portion 55 radially inwardly of the inner metal shroud 5 via the nut 58 and the screw 57 allow sandwiching the downstream tab 244 protruding radially from the downstream end 242 of the internal platform 24 of the ring sector 20 between two jaws formed by the downstream attachment tab 54, on the one hand, and the locking ring 56 on the other hand.

The internal platform 24, and more particularly its second portion 242, is thus sandwiched in the axial direction $D_A$ using an axial clamp of the inner support metal shroud 5 formed by the upstream attachment tab 53 and the assembly formed of the downstream attachment tab 54 and the locking ring 56. This configuration allows applying a downstream axial stress to each ring sector 20 to hold axially in position the ring sectors 20.

In the first embodiment illustrated in FIGS. 1 to 4, the inner metal shroud 5 thus comprises an annular seal 70 formed by the first and second sheet ring sections 71 and 72 and shaped to be interposed between the downstream attachment tab 54 and the downstream tab 244, between the downstream tab 244 and the locking ring 56, and between the portion 55 protruding radially inwardly and the locking ring 56.

The first sheet ring sections 71 and the second sheet ring sections 72 are arranged so as to avoid any alignment along the axial direction $D_A$ of the first inter-sector spaces 73 with the second inter-sector spaces 74, the interleaving of the first sheet sections and of the second sheet sections 71 and 72 making it possible to guarantee the sealing between the cavity under the CMC ring, that is to say radially inwardly of the CMC ring sectors 20, this cavity being identified by the reference C1 in FIG. 1, and the downstream cavity of the distribution ring, that is to say downstream of the distribution stage 2, this cavity being identified by the reference C2 in FIG. 1.

In addition, the locking ring 56 comprises radial slots 562 extending over a portion of the radial length of the crown from a radially outer end 564 of the locking ring 56. The locking ring 56 is disposed so that each radial slot 562 separates two ring sectors 20 of the nozzle stage 2. The radial slots 562 in the locking ring 56 allow increasing its flexibility.

Alternatively, the locking ring 56 could comprise a smaller number of radial slots 562, the radial slots and the locking ring being disposed so that each radial slot 562 separates two pairs of ring sectors 20 from the nozzle stage 2. Thus, a radial slot 562 would be disposed every two ring sectors 20. In other words, two successive radial slots 562 would be separated from each other in the circumferential direction by a length equal to the length of two ring sectors in the circumferential direction.

The outer metal shroud 9 comprises a centering lug 90 for each ring sector 20. The lug 90 is in the form of a pin fixed or secured to the outer metal shroud 9. The outer metal shroud 9 has an internal surface 91 and an external surface 92 along the radial direction $D_R$. The lug 90 extends from the internal surface 91 in the radial direction $D_R$ inwardly.

The second portion 262 of the external platform 26 of the ring sector 20 comprises a first orifice 263 configured to cooperate with a centering lug 90 of the outer metal shroud 9. When the rectifier stage 2 is assembled, the external surface 26e of the external platform 26 of the ring sector 20 is bearing against the internal surface 91 of the outer metal shroud 9 and the centering lug 90 passes through the corresponding orifice of the outer metal shroud 9 and the first orifice 263 of the second portion 262 of the external platform 26.

In addition, to secure the ring sector 20 to the outer metal shroud 9, the second portion 262 of the external platform 26 of the ring sector comprises a second orifice 264 intended to cooperate with a screw 95 passing through the outer metal shroud 9 through a first orifice 93 of the outer metal shroud 9 and the second orifice 264 of the second portion 262 of the external platform 26 of the ring sector 20. The screw 95 cooperates with a nut 96 to secure the outer metal shroud 9 and the ring sector 20 together.

The screw 95 and the lug 90 of the same ring sector 20 are disposed on either side of the extension 280 of the vane 28 of the ring sector 20 to improve the blocking of the ring sector about a radial axis. Likewise, the second orifice 264 and the first orifice 263 of the second portion 262 of the internal platform 26 are disposed on either side of the extension 280 of the vane 28 of the ring sector 20.

As illustrated in FIG. 2, each blade 28 has a hollow profile having an internal housing 285 extending over the entire height of the blade 28, that is to say between the internal platform 24 and the external platform 26 of the ring sector 20. The internal platform 24 of each ring sector 20 comprises an orifice 245 whose shape corresponds to the section of the internal housing 285 in the plane in which the internal platform 24 extends. Similarly, the external platform 26 of each ring sector 20 comprises an orifice 265 whose shape corresponds to the section of the internal housing 285 in the plane in which the internal platform 26 extends. The orifices 245 and 265 of the internal 24 and external 26 platforms are made in the extension of the internal housing 285 of the blade 28.

The internal housing 285 of the blade 28 and the orifices 245 and 265 of the internal 24 and external 26 platforms can be connected to a cooling system delivering a cooling air stream from the casing 4 up to the blade 28 and the internal 24 and external 26 platforms.

As illustrated in FIGS. 1 to 4, the turbine 1 further comprises, for each ring sector 20, a mast 6 extending in the radial direction $D_R$. The mast 6 comprises a mast head 61 bearing on the external surface 92 of the outer metal shroud 9, and a rod 62 protruding from the head 61 in the radial direction $D_R$ inwardly and configured to pass through the outer metal shroud 9, the internal housing 285 of the blade 28 and the orifices 245 and 265 of the internal 24 and external 26 platforms being aligned with the internal housing 285 of the blade 28.

The mast 6 further comprises a protruding portion 63 extending in a plane transverse to the radial direction $D_R$ along which the mast 6 extends. In the illustrated embodiment, the protruding portion 63 of the mast 6 forms an annular shoulder extending over a portion of the mast 6 intended to be in the internal housing 285 of the blade 28. The protruding portion 63 of the mast 6 forms a protrusion at least one portion of which is in contact with the blade 28 to hold the blade 28 in position.

In addition, the inner support shroud 5 comprises orifices 500 configured to receive the masts 6. Each mast 6 allows providing a means for fixing the CMC ring sector 20 from above, that is to say to the casing 4, while minimizing the bending moment, insofar as the bending length is reduced by about half due to the mast 6 passing through the annular sector. Each ring sector 20 of the nozzle stage is thus held in a deterministic manner, that is to say so as to prevent the ring sector 20 from vibrating and controlling its position, and this while allowing the ring sector 20 to be deformed under the effects of the temperature and of the pressure inter alia independently of the metal parts at the interface.

In the case where each ring sector comprised several blades, the turbine would comprise, at most, a corresponding number of masts for each nozzle ring sector.

In the embodiment illustrated in FIGS. 1 to 4, the external platform 26 of the ring sector 20 further comprises a first and a second reinforcement 266 and 267 disposed on either side of the blade 28 extension 280 and radially between the first portion 261 and the second portion 262 of the external platform 26. Each of the two reinforcements 266 and 267 comprises a first wall, respectively 2662 and 2672, bearing against a radially outer face of the first portion 261 of the outer platform 26, that is to say the face of the first portion 261 facing the second portion 262 of the external platform 26, and a second wall, respectively 2664 and 2674, bearing against a radially inner face of the second portion 261 of the outer platform 26, that is to say the face of the second portion 262 facing the first portion 261 of the external platform 26.

The second wall 2664 of the first reinforcement 266 comprises an orifice 2666 intended to be coaxial with the first orifice 263 of the second portion 262 of the external platform 26 and through which the centering lug 90 passes. The second wall 2674 of the second reinforcement 267 comprises an orifice 2676 intended to be coaxial with the second orifice 264 of the second portion 262 of the external platform 26 and through which the screw 95 passes, the nut 96 bearing on a radially inner surface of the second wall 2674 of the second reinforcement 267.

The first and second reinforcements 266 and 267 can be added during the consolidation phase through gaseous process or during the "Melt Infiltration" operation and thus secured to the ring sector 20.

In the first embodiment illustrated in FIGS. 1 to 4, the ring sector 20 further comprises a notch 29 made in the second portion 262 of the external platform 26 and in the second wall 2664 of the first reinforcement 266, and the outer metal shroud 9 comprises, for each ring sector 20, an abutment 94 configured to cooperate with the notch 29 of the external platform 26 of the ring sector 20. The notch 29 extends in a plane comprising the axial direction $D_A$ and the circumferential direction $D_C$ and the abutment 94 extends in a plane comprising the axial direction $D_A$ and the radial direction $D_R$.

In addition, the first portion 261 of the external platform 26 comprises a main portion 2610 defining an outer wall of the flowpath 45 of the gas stream F and a radial portion 265 protruding in the radial direction $D_R$ outwardly from an upstream axial end 2611 of the first portion 261.

The invention thus provides a turbine of a turbo engine comprising a CMC turbine nozzle stage whose mounting is simplified and adapted to hold the ring sectors in a deterministic manner while allowing the ring sector to be deformed independently of the metal parts at the interface.

The invention claimed is:

1. A turbine of a turbo engine comprising a casing and a turbine nozzle stage, the turbine nozzle stage including an outer support shroud made of metal and secured to the casing, an inner support shroud made of metal, and a plurality of ring sectors made of ceramic-matrix composite material forming a main crown and extending between the outer support shroud and the inner support shroud, the sectors defining an axial direction and a radial direction, and each sector having an internal platform and an external platform fixed to the outer support shroud and at least one blade extending between the external platform and the internal platform and fixed thereto, the internal platforms and the external platforms of the plurality of ring sectors delimiting a fluid flowpath, the internal platforms and the external platforms forming therebetween the fluid flowpath, wherein:

the external platform of each sector comprises a first portion equipped with an inner face forming an outer surface of the fluid flowpath, and a second portion radially distant and external to the first portion, the second portion of the external platform being fixed to the outer support shroud, a first reinforcement having a first reinforcement orifice and a second reinforcement having a second reinforcement orifice, the first and second reinforcements being disposed on either side of a portion of the blade extending radially between the first portion and the second portion of the external platform, respectively, wherein the second portion of the external platform further includes a first platform orifice, coaxial with the first reinforcement orifice, through which a centering lug of the outer support shroud extends, and a second orifice, coaxial with the second reinforcement orifice, through which a bolt extends, the internal platform of each sector comprises a first tab and a second tab extending along the radial direction protruding inwardly from respectively an upstream axial end and a downstream axial end of the internal platform, and the inner support shroud comprises a shoulder protruding in the radial direction outwardly and being positioned upstream and in abutment in the axial direction against said first tab, and a clamp axially downstream of the shoulder and including two jaws extending in the radial direction outwardly and held under stress towards each other against the second tab of the internal platform.

2. The turbine according to claim 1, wherein the jaws of the inner support shroud are held together by means of a screw passing through the two jaws and cooperating with a nut.

3. The turbine according to claim 1, wherein the inner support shroud further comprises first sheet ring sections and second sheet ring sections inserted between the two jaws, each second tab of the internal platform being disposed along the axial direction between one of said first sheet ring sections and one of said second sheet ring sections.

4. The turbine according to claim 3, wherein the first sheet ring sections form a first sheet crown having first spaces extending radially between said first sheet ring sections and the second sheet ring sections form a second sheet crown having second spaces extending radially between said second sheet ring sections, the first spaces and the second spaces being offset along the axial direction.

5. The turbine according to claim 4, wherein a first jaw of the two jaws is secured to the shoulder of the inner support shroud via a central portion, and a second jaw of the two jaws comprises a secondary crown equipped with radial slots extending over at least a portion of the radial length of said secondary crown.

6. The turbine according to claim 5, wherein said radial slots of the second jaw are offset along the axial direction relative to the second spaces and/or to the first spaces.

7. The turbine according to claim 5, wherein each radial slot separates two successive sectors of the nozzle stage.

8. The turbine according to claim 1, wherein said at least one blade of each sector has a hollow profile defining an inner housing extending between the internal platform and the external platform, the internal and external platforms of each sector each have an orifice communicating with said inner housing of said at least one blade, and each sector of the nozzle stage comprises at least one mast passing through said orifices of the platforms and the inner housing of said at least one blade, said mast being fixed to said casing and in connection with said sector and said inner support shroud.

9. The turbine according to claim 8, wherein the mast comprises at least one portion protruding in the axial direction in connection with the blade to hold the blade in position.

10. The turbine according to claim 8, wherein the inner support shroud comprises a perforated crown including orifices for receiving one end of the mast, and a retaining ring on which said perforated crown is mounted.

11. The turbine according to claim 1, wherein the external platform, the blade and the internal platform are formed in a single weaving part of ceramic-matrix composite material.

12. A turbo engine comprising at least one turbine of a turbo engine according to claim 1.

* * * * *